Sept. 3, 1957 A. W. RAUTH 2,804,964
HANDLING EQUIPMENT FOR ELECTRIC METERS
Filed Sept. 14, 1955 4 Sheets-Sheet 1
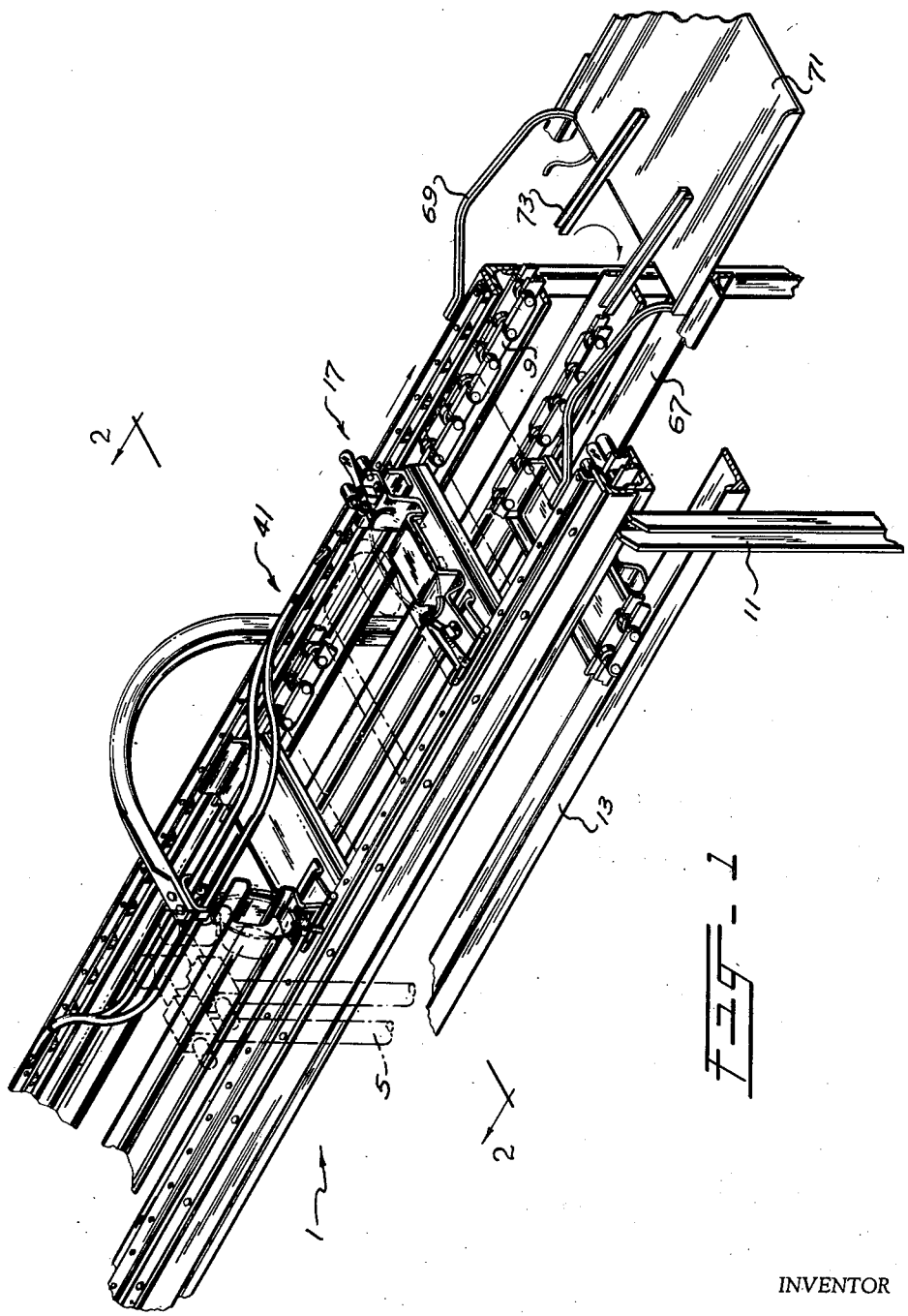
INVENTOR
ADOLPH W. RAUTH
BY
ATTORNEY

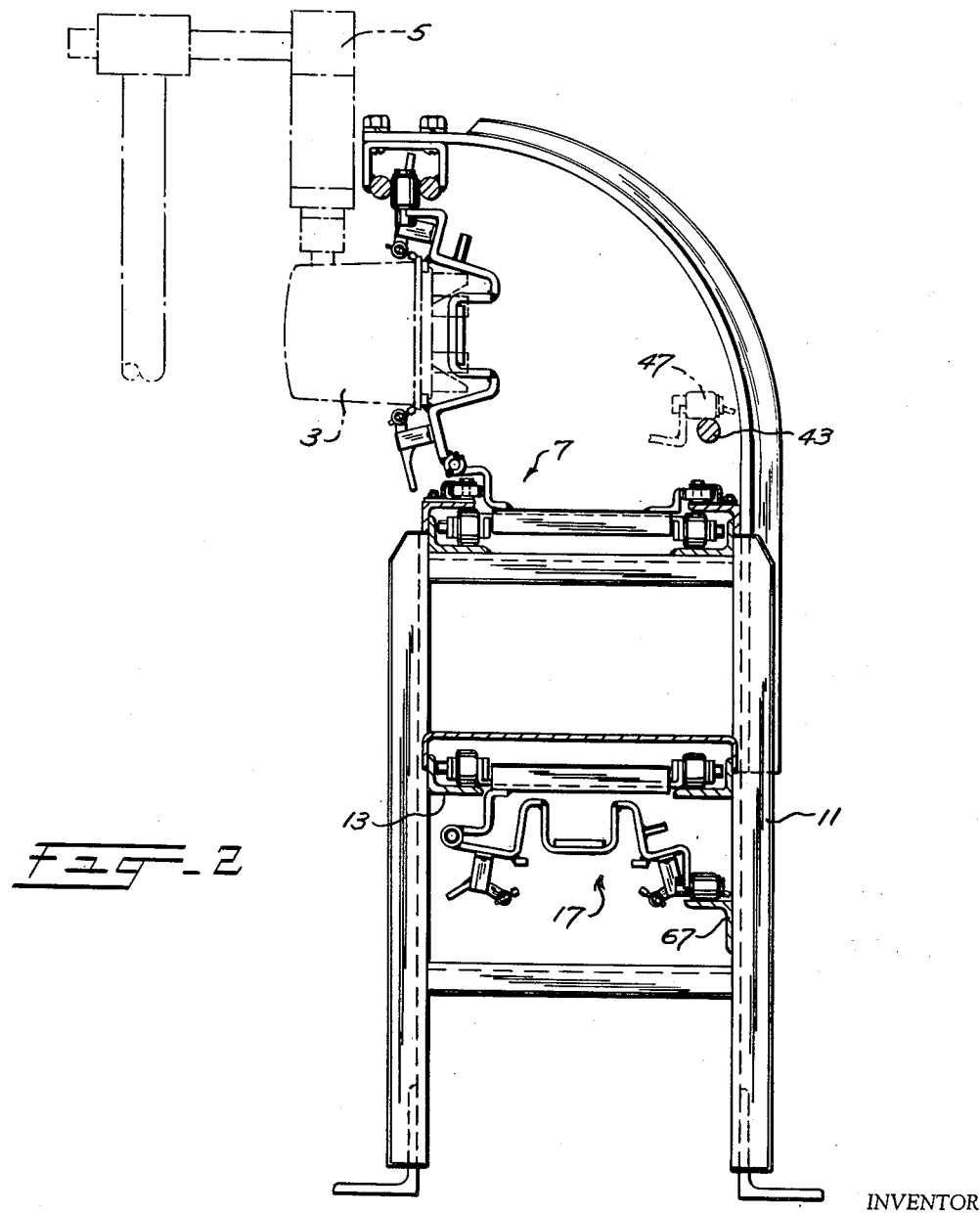

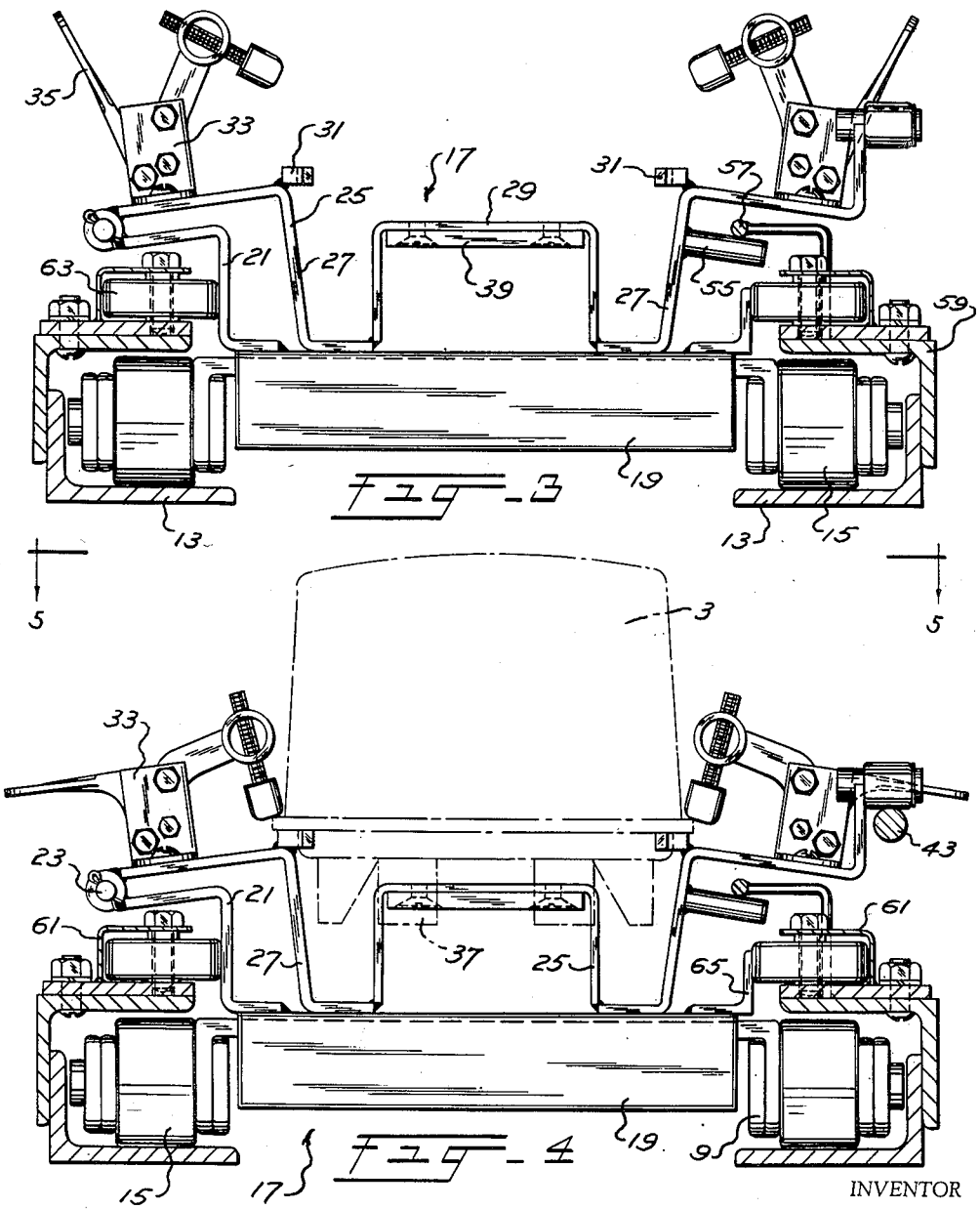

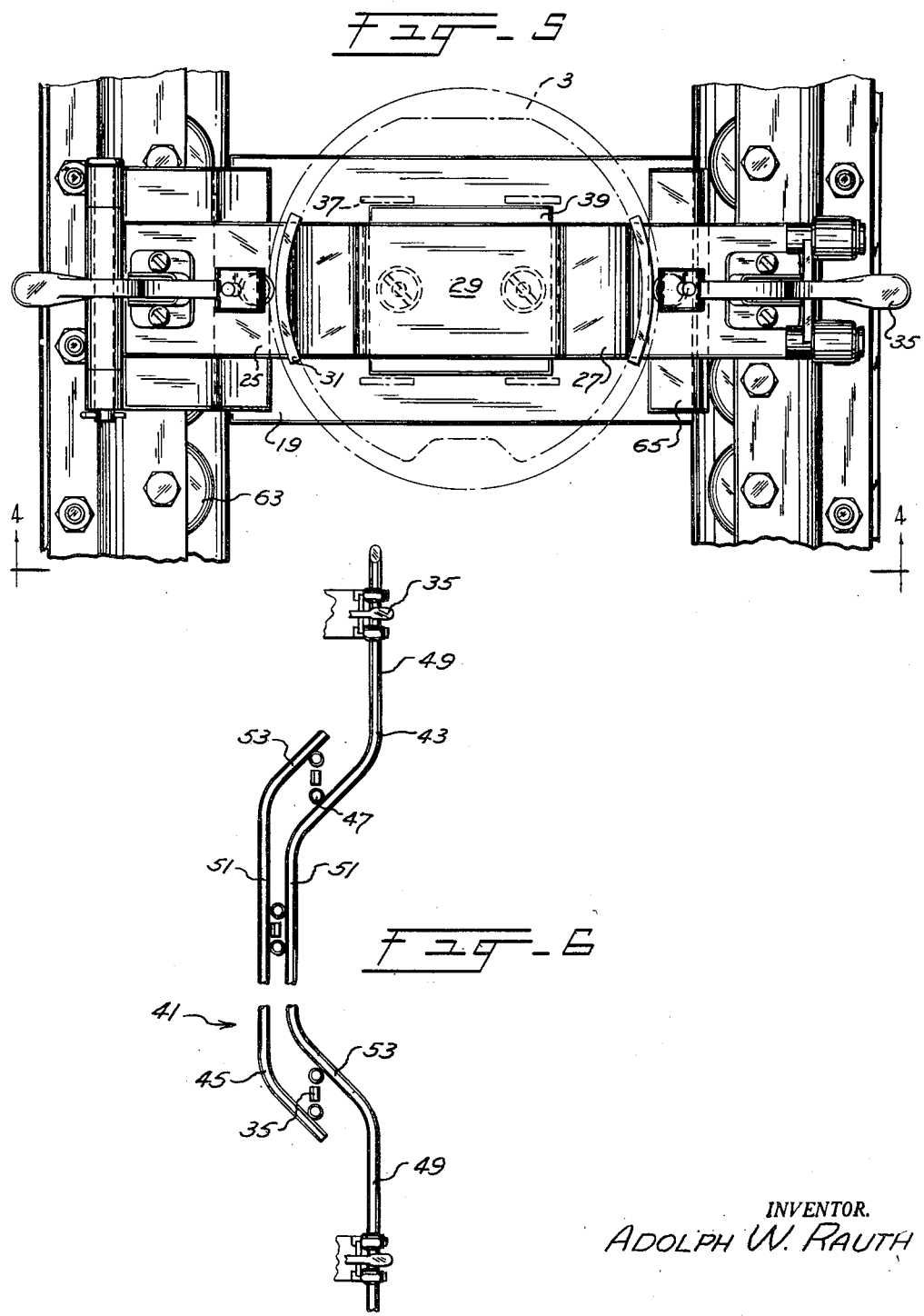

United States Patent Office 2,804,964
Patented Sept. 3, 1957

2,804,964
HANDLING EQUIPMENT FOR ELECTRIC METERS
Adolph W. Rauth, Jackson, Mich.

Application September 14, 1955, Serial No. 534,267

10 Claims. (Cl. 198—33)

The present invention relates to handling equipment for electric meters, and more particularly to work station type conveyors adapted to move electric meters past work stations at which are located equipment comprising electric testing devices, to facilitate performance upon the article of a work operation comprising the testing of electric meters.

Accordingly, it is an object of my invention to provide handling equipment for electric meters.

My invention also contemplates provision of a conveyor for carrying electric meters past a test station, having means to insulate the meter from the conveyor at the test station.

Another object of my invention is the provision of a conveyor adapted to move articles past a work station and specially constructed to orient the article in the vicinity of the work station.

A still further object of the invention is the provision of a conveyor having special article-carrying structure.

The invention also contemplates the provision of a conveyor having bracket means for carrying articles, in combination with means to steady the brackets and the articles carried thereby during movement of the conveyor.

Still another object of the invention is the provision of a conveyor having relatively movable parts and means for effecting and restraining relative movement of the parts.

Yet a further object of my invention is the provision of a conveyor for carrying articles, having special discharge devices associated therewith for removing articles from the conveyor.

Finally, it is an object of my invention to provide a conveyor which will be relatively simple and inexpensive to manufacture, easy to operate and use in connection with work operations performed at work stations, and which will be rugged and durable in use.

Other objects and advantages of the invention will become apparent from the following description taken in conjunction with the accompanying drawings, in which:

Figure 1 is a perspective view of a conveyor according to my invention, with parts broken away entirely and other parts shown in broken line;

Figure 2 is a transverse cross-sectional view taken on the line 2—2 of Figure 1;

Figures 3 and 4 are enlarged partial cross-sectional views taken on the line 2—2 of Figure 1 and showing the article-carrying means without an electric meter and with an electric meter, respectively;

Figure 5 is a partial plan view of the article-carrying means, taken on the line 5—5 of Figure 4; and Figure 6 is a plan view of the track means with parts broken away.

Referring now to the drawings in greater detail, I have shown a conveyor generally indicated at 1, of the work station type, for carrying a plurality of electric meters 3 or other articles past a work station which in the illustrated embodiment is a testing station at which are located electrical testing devices 5. The conveyor assembly comprises an endless conveyor 7 made up of a pair of endless pull elements 9 circulating in a conveyor frame 11 and trained about head and foot pulleys (not shown) driven by a conventional motor (not shown) adapted to impart intermittent movement to the conveyor in a conventional manner so as to permit successive positioning of the articles at the work station for the performance thereon of the work operation. Frame 11 supports the conveyor on pairs of opposed channel members 13 on which the chain rollers 15 ride. In addition to chain rollers 15, pull elements 9 comprise conventional assemblies of link pins and side bars. Thus, upper and lower horizontal conveyor runs are defined by the arrangement of conveyor 7 in frame 11.

Conveyor 7 is provided with bracket means generally designated at 17 and comprising a plurality of transverse supporting members 19 which when positioned on the upper runs of conveyor 7 are in the general shape of inverted pans having downturned flanges at their ends which replace a corresponding side bar on each of pull elements 9, so that supporting members 19 are connected at each end to the pull elements for movement therewith. On the upper or outer side of each supporting member 19 is mounted an L-shaped bracket 21 which extends upwardly and outwardly from its associated supporting member 19, as perhaps best seen in Figures 3 and 4, and terminates in a pivotal hinge assembly 23 on which is pivotally mounted an article-carrying bracket 25. It should be noted that the pivotal axis of hinge assembly 23 is horizontal and parallel to conveyor 7 and pull elements 9, and is disposed to one side of conveyor 7, above the conveyor and more closely adjacent one pull element 9 than the other pull element.

Article-carrying bracket 25 is an elongated member of generally sinuous configuration as seen in Figures 3 and 4, and includes a pair of downwardly extending, upwardly opening loops 27 spaced laterally on either side of the center line of the conveyor and defining between them a central, upwardly extending loop 29. On the upper portion of bracket 25 are located means for retaining articles on the bracket, which in the illustrated embodiment comprise electric meters 3. These retaining means comprise arcuate supports 31 which engage under and support the flange of an electric meter 3, and over-center toggle clamps 33, conventional in themselves, which are engageable with the top of the flange of electric meters 3 and are moved back and forth from engagement to inoperative position by means of operating levers 35. Meters 3 are provided with terminals 37 which must be insulated from the conveyor when the meter is being tested in a testing station 5; and to this end, an insulating spacer plate 39 of insulating material such as plastic or hard rubber or wood or the like is fastened to the underside of the highest portion of central loop 29 and extends forwardly and rearwardly of bracket 25 longitudinally of the conveyor so as to space terminals 37 from any other portion of the conveyor and at the same time brace electric meter 3 by contact with the terminals.

For certain work operations, and in the illustrated embodiment for the purpose of testing electric meters, it is necessary to change the position of electric meter 3 from that shown in Figure 4, in which bracket 25 rests on top of supporting member 19 on downwardly extending loops 27, to the position shown at the top of Figure 2 in which bracket 25 is tilted upwardly about the axis of hinge assembly 23 to a vertical position. For this purpose, track means generally indicated at 41 are provided, comprising a pair of tracks or bars 43 and 45 adapted to engage with a pair of rollers 47 mounted on the end of bracket 5 opposite the end embodied in hinge assembly 23. It should be noted that rollers 47 are longitudinally spaced apart and are mounted for rotation on pivot pins which define parallel horizontal axes in the position of bracket 25 shown in Figures 3, 4 and 5.

Track means 41 are perhaps best shown in Figure 6 when compared with Figure 1, and are seen to curve upwardly and inwardly over conveyor 7 from their lowest portions 49 disposed a short distance above the side of conveyor 7 opposite hinge assembly 23 to their highest portions 51 disposed a substantially greater distance above conveyor 7 on the same side as hinge assembly 23. Portions 49 and 51 are connected by arcuate inclined portions 53 having a quarter-spiral configuration. Inasmuch as rollers 47 are longitudinally aligned, and lowest portions 49 and highest portions 51 of bars 43 and 45 are parallel, bars 43 and 45 are spaced apart throughout their highest and lowest portions a distance substantially equal to the diameter or width of a roller 47, thereby to maintain both bars in contact with the rollers over the extent of these portions. However, since rollers 47 will have a lateral component of movement over the course of inclined portions 53, bars 43 and 45 will be spaced apart over these inclined portions a distance substantially greater than the diameter of a roller 47 so that both rollers 47 will be accommodated between bars 43 and 45 in transit over inclined portions 53, and so that the track means comprising the pair of bars will contact both rollers 47 over the entire course of inclined portions 53, as seen in Figure 6, in which the lower portions of bar 45 are broken away for purpose of simplicity. Bar 45 need not be coextensive with bar 43 except over that portion of the path of travel of bracket 25 in which the bracket is in raised position. It should be noted that track means 41 are disposed in the vicinity of a work station and that they serve to orient the article for the performance of a work operation and at the same time steady the article and its associated bracket during raising and lowering and during the work operation.

For the purpose of steadying the bracket when positioned as shown in Figures 3, 4 and 5, that is, when resting on supporting member 19, hold-down means are provided comprising a pin 55 rigidly mounted on bracket 25 and engaged on its upper surface by a pair of elongated hold-down bars 57 mounted on frame 11. Bars 57 are longitudinally aligned and parallel to conveyor 7 and are of course discontinuous in the vicinity of track means 41 so that bracket 25 may be swung upwardly in the vicinity of a work station as described above. Frame 11 is provided with further opposed channels 59 which serve to maintain chain rollers 15 on their designated course, but more particularly function to support inwardly directed channels 61 and a plurality of opposed pairs of guide rollers 63 mounted for free rotation on vertical axes within channels 61. Rollers 63 contact L-shaped brackets 21 on one side of bracket means 17 and contact angle members 65 mounted on supporting members 19 on the other side of bracket means 17, to position conveyor 7 accurately within frame 11 and to steady bracket means 17 and the article carried thereby throughout all positions of vertical adjustment of bracket 25. Adjacent the return run of conveyor 7, a further angle 67 is mounted on frame 11 as seen in Figure 2 to support rollers 47 and hence bracket 25 throughout the return run.

Operating levers 35 may of course be operated by hand to clamp or release electric meters 3 from bracket 25; but it is preferred to provide means for automatically operating these levers. To this end, a pair of cam tracks 69 is provided adjacent the discharge end of the conveyor for camming operating levers 35 upwardly to their release position as seen in Figure 3. A similar pair of tracks (not shown), of complementary configuration, is provided at the other end of the upper run of the conveyor automatically to depress operating levers 35 to clamp meters 3 onto their supporting bracket.

Means for automatically discharging articles carried by the conveyor are provided, comprising a discharge platform 71 to which are fixedly mounted a pair of parallel discharge tracks comprising a pair of elongated members 73 which are parallel to each other and to the upper run of the conveyor. Elongated members 73 are aligned with downwardly extending loops 27 to interfinger with these loops when the movement of the conveyor toward the discharge end causes loops 27 to pass about and under elongated members 73. The downward movement of bracket 25 about the pulley (not shown) at the discharge end of the conveyor, as shown by the arrow in Figure 1, leaves the article resting on elongated members 73 while bracket 25 drops away to continue along the return run.

It will of course be understood that the present invention may be used for the performance of a great variety of work operations other than the testing of electric meters, including the performance of steps of fabrication on uncompleted work pieces, coating operations, treatments with radiant energy, treatments with fluids, and the like.

Thus, from a consideration of the foregoing disclosure, it will be obvious that I have achieved all of the initially recited objects of my invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. Handling equipment for electric meters adapted to move electric meters carried thereby past a testing station, comprising endless conveyor means having transverse meter-supporting structure spaced along said means, meter-carrying bracket means carried on said structure and having a pivotal connection therewith adjacent one edge of said conveyor means for pivotal movement about an axis parallel to and disposed to one side of said conveyor means, and track means disposed adjacent said conveyor means to contact said bracket means and swing said bracket means upwardly about said axis in the vicinity of a said testing station.

2. Handling equipment for electric meters adapted to move electric meters carried thereby past a testing station, comprising a pair of endless pull elements, a transverse supporting member connecting said pull elements, a meter-carrying bracket mounted on the outer side of said supporting member for pivotal movement about an axis parallel to and disposed adjacent one of said pull elements, and track means disposed adjacent said pull elements to contact said bracket and swing said bracket upwardly about said axis in the vicinity of a said testing station.

3. Handling equipment for electric meters adapted to move electric meters carried thereby past a testing station, comprising an endless conveyor having a horizontal run, a meter-carrying bracket mounted on said conveyor for pivotal movement about a horizontal axis disposed to one side of said conveyor, said bracket comprising a sinuous member having a pair of downwardly extending upwardly open loops defining a central upwardly extending loop between them, means on the upper portions of said bracket for retaining a meter on said bracket, a piece of insulating material on said upwardly extending loop extending forwardly and rearwardly of said bracket longitudinally of said conveyor to contact the terminals of a said meter and insulate them from the remainder of said conveyor, and track means mounted adjacent said conveyor to contact said bracket and swing said bracket upwardly about said axis in the vicinity of a said testing station.

4. A conveyor adapted to move articles carried thereby past a work station, comprising an endless conveyor having a horizontal run, an article-carrying bracket mounted adjacent one end of said bracket on said conveyor for pivotal movement about an axis parallel to and disposed to one side of said conveyor, a pair of rollers mounted on the other end of said bracket and spaced apart longitudinally of said horizontal run, track means disposed above said horizontal run to contact said rollers and swing said bracket upwardly about said axis in the vicinity of a said work station, said track means contacting both said rollers in said upwardly inclined positions of said bracket, said track means comprising a pair of tracks between which said rollers are confined, said tracks being arcuate upwardly and inwardly over said horizontal run, the highest portions of said tracks being straight and parallel to said horizontal run and to each other and spaced apart a distance substantially the width of a said roller, said tracks having portions on either side of said highest portions inclined downwardly and outwardly of said conveyor from said highest portions and spaced apart a distance substantially greater than said highest portions.

5. A conveyor adapted to move articles carried thereby past a work station, comprising a conveyor frame; a pair of endless pull elements adapted to circulate in said frame and having a horizontal run; bracket means comprising a transverse supporting member and an article-carrying bracket, said transverse supporting member connecting said pull elements together and said article-carrying bracket being mounted on said supporting member for pivotal movement about a horizontal axis parallel to and disposed adjacent one of said pull elements; track means mounted on said frame to contact said bracket and swing said bracket upwardly about said axis in the vicinity of a said work station; and a plurality of pairs of opposed rollers mounted on said frame for rotation about vertical axes and contacting the sides of said bracket means to steady said bracket means.

6. A conveyor adapted to move articles carried thereby past a work station, comprising a conveyor frame, a pair of endless pull elements adapted to circulate in said frame and having a horizontal run, a transverse supporting member connecting said pull elements, an article-carrying bracket mounted on said supporting member for pivotal movement about a horizontal axis parallel to said horizontal run and parallel to and disposed adjacent one of said pull elements, track means mounted on said frame to contact said bracket and swing said bracket upwardly about said axis in the vicinity of a said work station, said bracket resting on said supporting means in lowered position, and hold-down means mounted on said frame and comprising a pair of elongated members, longitudinally spaced apart in the vicinity of said track means, to engage an upper surface of said bracket and maintain said bracket in lowered position against said supporting member when said bracket is out of contact with said track means.

7. A conveyor adapted to move articles carried thereby past a work station, comprising a pair of endless pull elements having a horizontal run, a transverse supporting member interconnecting said pull elements, an article-carrying bracket pivotally mounted at one end on said supporting member for vertical swinging movement about a horizontal axis parallel to said horizontal run and adapted to overlie and rest on said supporting member when said bracket is in lowered position, and track means disposed adjacent said horizontal run to contact the other end of said bracket and swing said bracket upwardly about said axis in the vicinity of a said work station.

8. The invention of claim 7, in which said bracket comprises a sinuous member having a pair of downwardly extending upwardly open loops defining between them a central upwardly extending loop, and means on the upper portions of said bracket for retaining an article thereon, said bracket in lowered position resting on said supporting member on said downwardly extending loops.

9. The invention of claim 8, and discharge means at the discharge end of said horizontal run comprising a pair of elongated parallel members aligned with said downwardly extending loops so that the movement of said horizontal run will cause said elongated members to enter said downwardly extending loops to remove a said article from said bracket.

10. A conveyor adapted to carry articles, comprising an endless conveyor having a horizontal run having a discharge end, an article-carrying bracket mounted on said conveyor and comprising a sinuous member having a pair of downwardly extending upwardly open loops defining between them a central upwardly open loop, means on the upper portions of said bracket for retaining an article thereon, and discharge means at said discharge end of said horizontal run comprising a pair of elongated parallel members aligned with said downwardly extending loops so that the movement of said horizontal run will cause said elongated members to enter said downwardly extending loops to remove a said article from said bracket.

References Cited in the file of this patent

UNITED STATES PATENTS

| | | |
|---|---|---|
| 1,642,824 | Paulson | Sept. 20, 1927 |
| 1,913,746 | Butler | June 13, 1933 |
| 2,642,212 | Currivan | June 16, 1953 |